(12) United States Patent
Jian

(10) Patent No.: US 7,117,111 B2
(45) Date of Patent: Oct. 3, 2006

(54) ADJUSTING METHOD OF A TILT METER

(75) Inventor: Zhang-Yong Jian, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/120,474

(22) Filed: May 2, 2005

(65) Prior Publication Data

US 2006/0161362 A1   Jul. 20, 2006

(30) Foreign Application Priority Data

Jan. 14, 2005  (TW) .............................. 94101233 A

(51) Int. Cl.
  G01C 17/38  (2006.01)
  G01P 21/00  (2006.01)
  G06F 19/00  (2006.01)
(52) U.S. Cl. ....................................................... 702/93
(58) Field of Classification Search ............ 702/93–95, 702/150–154; 33/286, 290, 291, 366.11, 33/366.12
See application file for complete search history.

(56) References Cited

U.S. PATENT DOCUMENTS 6,880,257 B1 *  4/2005  Fang ........................ 33/366.15
6,978,569 B1 * 12/2005  Williamson et al. .......... 42/132
6,988,319 B1 *  1/2006  Hung .......................... 33/291

* cited by examiner

Primary Examiner—Michael Nghiem
(74) Attorney, Agent, or Firm—Thomas, Kayden, Horstemeyer & Risley

(57) ABSTRACT

The present invention provides an adjusting method of a tilt meter. First, multiple holding signals of the same direction output from a tilt sensor, respectively, are differentiated to obtain at least a tilt signal. Then, a first judging step is performed to determine whether the tilt signal is in a predetermined range or not and a rough tuning step is executed to limit the voltage of the tilt signal in the predetermined range. Then, the voltage of the tilt signal in the predetermined range is amplified by a predetermined multiple. Afterwards, a second judging step is performed to determine whether the tilt signal after amplification is equal to a level voltage or not and a delicate tuning step is proceeded to adjust the voltage of the tilt signal to become equal to the level voltage.

20 Claims, 3 Drawing Sheets

ADJUSTING METHOD OF A TILT METER

RELATED APPLICATIONS

The present application is based on, and claims priority from, Taiwan Application Serial Number 94101233, filed Jan. 14, 2005, the disclosure of which is hereby incorporated by reference herein in its entirety.

FIELD OF THE INVENTION

The present invention relates to an adjusting method of a tilt meter, and more particularly, to a level adjusting method of a laser tilt meter which is set in an apparatus and suitable to measure the tilt angle between the apparatus and the horizon and further to do the leveling.

BACKGROUND OF THE INVENTION

Tilt sensors have a variety of applications due to their accurate measurements of levelness. Tilt sensors also have good reliability and are easy to obtain, so they were originally designed for the aim of weapons and the navigation of aircraft; and now they are also applied to the alignment of automobile wheels and even the detection of earthquakes and the facilitation of laser tilt meters. The principle of how the tilt sensor works is illustrated in FIG. 1. As shown in FIG. 1, the tilt sensor 100 includes an electrolyte 102 and four electrodes (104, 106, 108, 110). Well known is that the conductivity between two electrodes is proportional to the length of electrode immersed in an electrolyte. Even if the ground is not horizontal to the sensor, the surface of the electrolyte in the tilt sensor remains level due to gravity. The electrolyte is electrically conductive, and since the conductivity between the two electrodes is proportional to the length of electrode immersed in the electrolyte, the resistance changes in proportion to the tilt angle. Therefore, the slant of the tilt sensor is derived from the resistance corresponding to the tilt angle.

In the tilt sensor, signals with the same single electrical property are sent to the four input pins of the tilt sensor alternately and multi-directionally in turn to measure the level of the two directions. The output pin of the tilt sensor generates a series of output signals composed of a plurality of output signals according to the slant status. Then, a microcontroller unit (MCU) separates the series of output signals composed of a plurality of output signals into four independent and continuous signals, wherein the four signals contain the tilt information of both directions. Next, the microcontroller unit transfers the four signals into four corresponding voltages, differentiates the signals of the same direction, and then analyzes the result to obtain the slant information of the two directions. Furthermore, based on the slant information, the microcontroller unit determines the horizontal status and then accordingly drives a level-adjusting device, such as a motor. After many recursions and modifications, the surface of the electrolyte in the tilt sensor will become level at last.

However, the microcontroller unit may need to repeatedly drive the motor to adjust the position of the tilt sensor. Moreover, since the position of the tilt sensor changes, the output data has a lag, thus prolonging the adjusting time for the tilt sensor to become level. In current practice, about 15 seconds are spent for the tilt sensor to become level, wherein the time needed is related to the difference between the initial position of the tilt sensor and the position of being level.

SUMMARY OF THE INVENTION

Therefore, one objective of the present invention is to provide an adjusting method of a tilt meter in which the adjusting is composed of a rough tuning step and a delicate tuning step to raise the precision of the adjusting and to speed up the adjusting.

Another objective of the present invention is to provide an adjusting method of a tilt meter in which the tilt signal is amplified to increase the adjusting accuracy of the tilt sensor.

Still another objective of the present invention is to provide an adjusting method of a tilt meter in which an electric motor is used so that the adjusting time of the tilt sensor may be reduced.

According to the aforementioned objectives, the present invention provides an adjusting method of a tilt meter, comprising the following steps. First, a plurality of level-measuring signals is input to a tilt sensor, and the tilt sensor outputs a series of output signals wherein the series of output signals are composed of a cycle of the level-measuring signals. Next, the series of output signals are divided into a plurality of holding signals. Then, the holding signals of the same direction are differentiated respectively to obtain at least a tilt signal, and a first judging step is started. If the tilt signal is not in a predetermined range, a rough tuning step is performed wherein a motor is driven to adjust the tilt sensor to limit the tilt signal to within the predetermined range. The tilt signal is amplified if it is in the predetermined range. Then, a second judging step is performed. If the tilt signal after amplification is not equal to a level voltage, the motor is driven to adjust the tilt sensor to undergo a delicate tuning step to adjust the tilt signal to become equal to the level voltage. If the tilt signal after amplification is equal to the level voltage, the level adjusting of the tilt meter is finished.

According to a preferred embodiment of the present invention, the present invention further comprises presetting the level voltage corresponding to a location in which the tilt sensor is set level. In the preferred embodiment of the present invention, the motor is an electric motor, and the tilt sensor is a single-axis electrolytic tilt sensor or a dual-axis electrolytic tilt sensor. The level-measuring signals are identically wide and are spaced at one or a plurality of intervals and are alternately and multi-directionally input to the tilt sensor. The level-measuring signals are positive pulses, negative pulses or both positive and negative pulses and are generated by a signal-generating module. The signal-generating module may be a signal generator or a pulse generating circuit.

In the preferred embodiment of the present invention, the step of dividing the series of output signals into the holding signals occurs in a sample-and-hold module in which the sample-and-hold module triggers and outputs the first holding signal and the second holding signal according to a plurality of trigger signals, the trigger signals being the level-measuring signals or signals having a same time sequence as the level-measuring signals. The sample-and-hold module may be a sample-and-hold circuit. The step of differentiating the holding signals of the same direction to obtain the tilt signal occurs in a differential module. The differential module may be a differential amplifier, a subtracter or a microcontroller.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention discloses an adjusting method of a tilt meter suitable to for use in a laser tilt meter. In order to make the illustration of the present invention more explicit and complete, the following description is stated with reference to FIG. 2 and FIG. 3.

Figure 1:
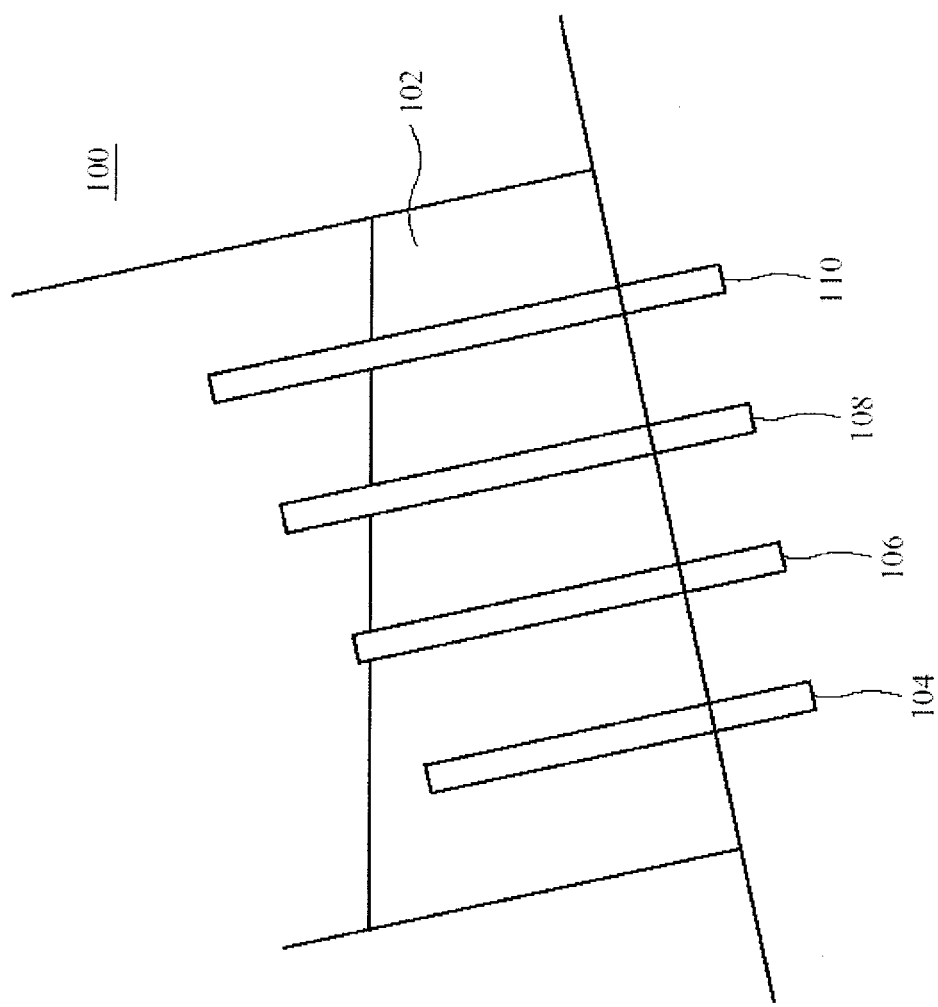
FIG. 1 illustrates the principle of how the tilt sensor works.
Figure 2:
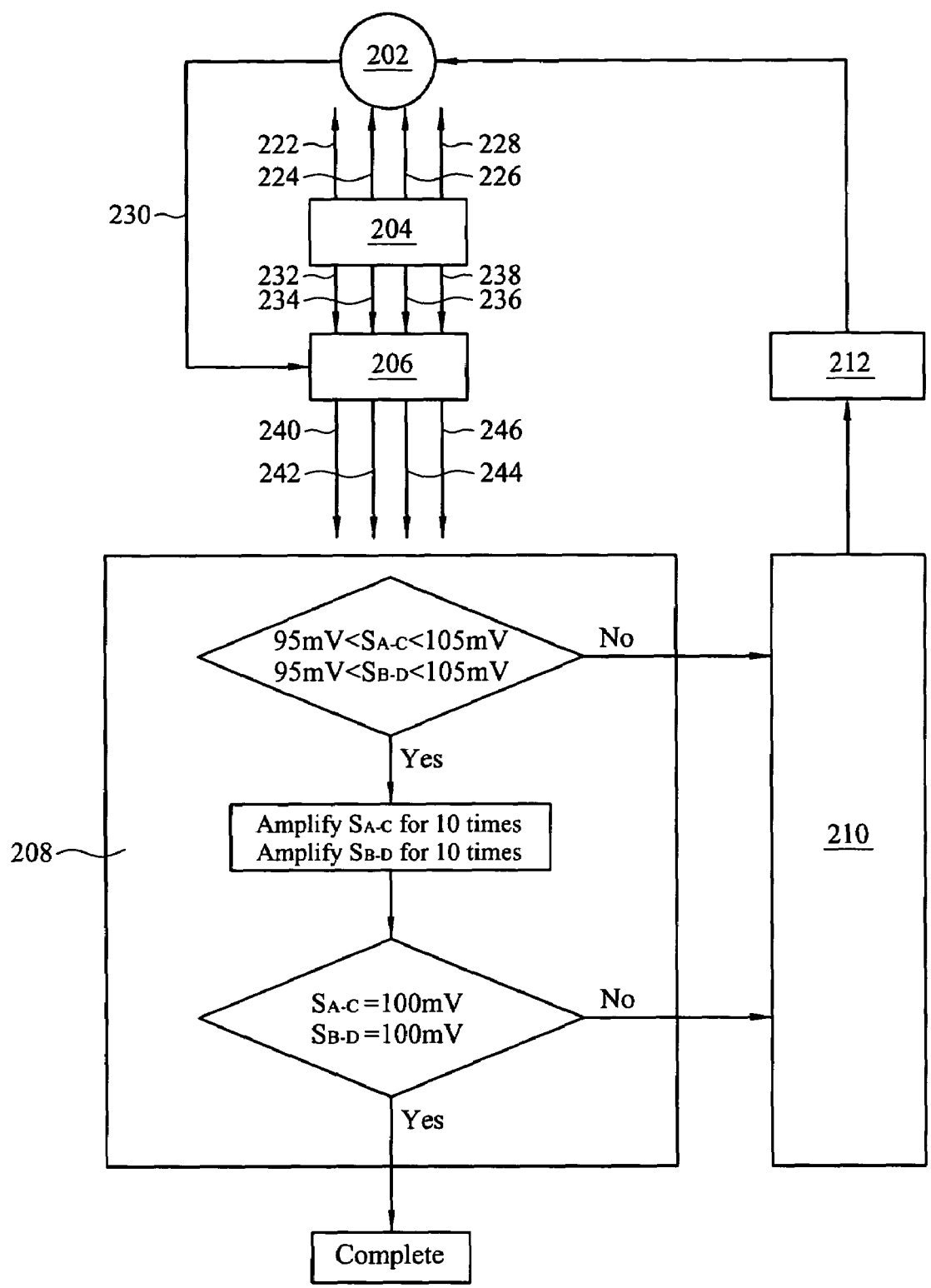
FIG. 2 illustrates the flow diagram of the tilt meter according to the preferred embodiment of the present invention.
Figure 3:
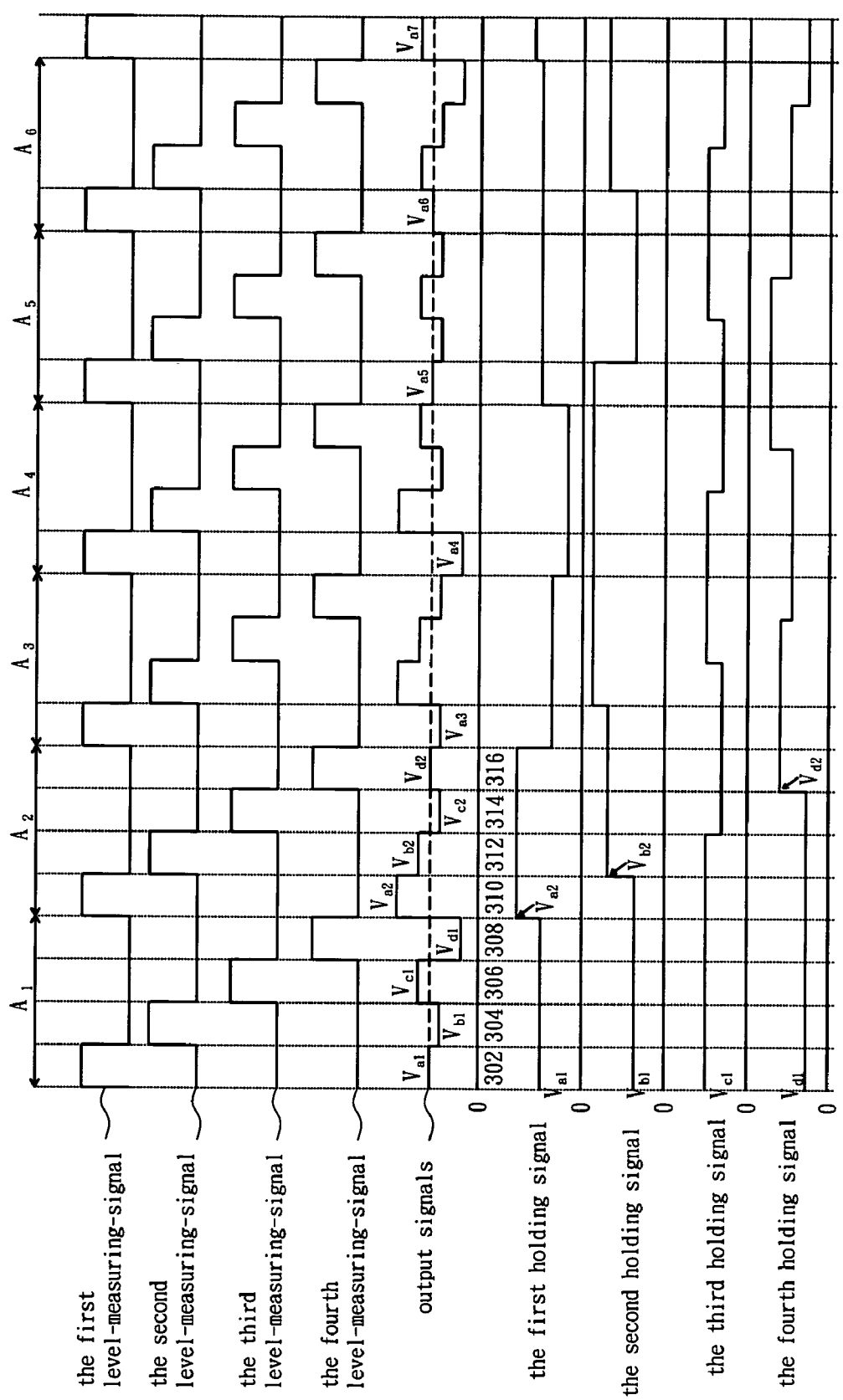
FIG. 3 illustrates the diagram of the signals according to the preferred embodiment of the present invention.

FIG. 2 illustrates the flow diagram of the tilt meter according to the preferred embodiment of the present invention, and FIG. 3 illustrates the diagram of the signals according to the preferred embodiment of the present invention. The preferred embodiment of the present invention comprises a tilt sensor 202, a signal-generating module 204, a sample-and-hold module 206, a differential module 208, a microcontroller unit 210, and a motor 212. The tilt meter of the embodiment has a preset level voltage of 100 mV that corresponds to a position in which the tilt sensor 202 is set level. As shown in FIG. 2, first, the signal-generating module 204 regularly generates a plurality of level-measuring signals with equal intervals. The level-measuring signals are the first level-measuring signal 222, the second level-measuring signal 224, the third level-measuring signal 226, and the fourth level-measuring signal 228. These level-measuring signals have the same time sequence and pulse width and are spaced at one or a plurality of intervals. The level-measuring signals are positive pulses, negative pulses or both positive and negative pulses. They are alternately and multi-directionally sent to the first input pin A, the second input pin B, the third input pin C, and the fourth input pin D of the dual-axis tilt sensor 202 in turn, respectively. The first and the third input pins are settled opposite to the second and the fourth input pins. According to the level-measuring signals, the output pin of the tilt sensor generates a series of output signals 230 comprising the first measuring cycle A1, the second measuring cycle A2, the third measuring cycle A3, the forth measuring cycle A4, the fifth measuring cycle A5, and the sixth measuring cycle A6 in every cycle of the series of output signals as shown in FIG. 3. The output signals in each measuring cycle contain a first output signal 302, a second output signal 304, a third output signal 306, and a fourth output signal 308. The first and the third input pins output signals containing the tilt information of one direction via the output pin of the dual-axis tilt sensor 202, while the second and the fourth input pins output signals containing the tilt information of the other direction via the output pin of the dual-axis tilt sensor 202. That is, the series of output signals 230 from the output pin includes the tilt information of two directions.

Simultaneously, these level-measuring signals are also sent to the sample-and-hold module 206 as trigger signals 232, 234, 236 and 238 for sampling and holding the first output signal 302, the second output signal 304, the third output signal 306, and the fourth output signal 308, respectively. Thus, the holding signals 240, 242, 244 and 246 corresponding to the level-measuring signals 222, 224, 226 and 228 will be separated.

The following describes in detail the method of sampling and holding the series of output signals 230 to divide the holding signals. As shown in the drawings, the first level-measuring signal 222, the second level-measuring signal 224, the third level-measuring signal 226, and the fourth level-measuring signal 228 have the same time sequence and are spaced at one interval and are alternately sent to each input pin of the dual-axis tilt sensor 202 in turn, respectively. Therefore, in the first cycle A1, taking the first level-measuring signal 222 as an example, if the first output signal 302 as shown in FIG. 3 is generated from the output pin of the dual-axis tilt sensor 202 in accordance with the tilt condition, the first output signal 302 going through the sample-and-hold module 206 will be divided into the first holding signal 240 of which the voltage is equal to Va1 in the first output signal 302. The sample-and-hold module 206 keeps the voltage Va1 of the first holding signal 240 until the second cycle A2 and then changes to the voltage Va2 of the first output signal 310 in the second cycle A2. The voltage variation of the output signal in every cycle represents the voltage variation of the input pins according to the slant status. Similarly, the second holding signal 242, the third holding signal 244, and the fourth holding signal 246 can also be obtained. That is, the variation of voltage according to the slant status evaluated by the input pins can be acquired.

Referring further to FIG. 2, the first holding signal 240, the second holding signal 242, the third holding signal 244, and the fourth holding signal 246 are sent to the differential module 208 to differentiate the holding signals (240–244 or 242–246) of the same direction (A-C or B-D). The first holding signal 240 and the third holding signal 244 are differentiated to get the first tilt signal $S_{A-C}$, whereas the second holding signal 242 and the fourth holding signal 246 are differentiated to get the second level-estimating-result signal $S_{B-D}$. A first judging step is then started. If the voltages of $S_{A-C}$ and $S_{B-D}$ are not in a predetermined range, for example, 95 mV to 105 mV in the embodiment, a rough tuning step is proceeded wherein the motor 212 is driven by the microcontroller unit 210 to adjust the position of the tilt sensor 202 to limit the voltages of $S_{A-C}$ and $S_{B-D}$ to within the predetermined range. If the voltages of $S_{A-C}$ and $S_{B-D}$ are in the predetermined range, the voltages of $S_{A-C}$ and $S_{B-D}$ are amplified, for example, by 10 times in the embodiment. Another goal of the rough tuning step is to make the voltages of the tilt signals greater than zero, such as Va1>Vc1 and Vb1>Vd1, have the subsequent amplifying circuit work normally.

After the differential module 208 amplifies the voltages of $S_{A-C}$ and $S_{B-D}$, a second judging step is proceeded. If the voltages of $S_{A-C}$ and $S_{B-D}$ are not equal to the level voltage, the motor 212 is driven again by the microcontroller unit 210 to adjust the position of the tilt sensor 202 by undergoing a delicate tuning step to adjust the voltages of $S_{A-C}$ and $S_{B-D}$ to become equal to the level voltage. If the voltages of $S_{A-C}$ and $S_{B-D}$ are equal to the level voltage, the level adjusting of the tilt meter is finished.

Therefore, a feature of the present invention is that a rough tuning step is first executed in the present invention to limit the voltage of the tilt signal of the same direction to within a predetermined range and make it greater than zero. Then, the voltage of the tilt signal in the predetermined range is amplified by a predetermined multiple to proceed a delicate tuning step, and further to adjust the voltage of the tilt signal of the same direction to become equal to the level voltage.

Another feature of the present invention is that the adjusting accuracy of the tilt sensor 202 may be raised by amplifying the voltage of the tilt signal in the predetermined range by the differential module 208, thus benefiting the processing of the signals afterwards.

Still another feature of the present invention is that the motor 212 used in the present invention is an electric motor, thus reducing the level-adjusting time of the tilt sensor 202.

It is noted that, in setting the level voltage, although the voltage of the tilt signal is supposed to be zero when the tilt sensor is in horizontal status, to prevent the malfunction in processing the zero signals in the microcontroller unit 210 (not able to amplify the voltage difference), a voltage Va is added to the holding signals of the same direction (A-C or B-D) to make the differential module 208 output a fixed voltage Va, even though the tilt meter is level, to benefit the subsequent delicate tuning step. The formulas for differentiating are Adata+Va−Cdata=OutData and Bdata+Va−Ddata=OutData. When the tilt sensor is level, Adata=Cdata and Bdata=Ddata, where Adata, Bdata, Cdata and Ddata are the first holding signal 240, the second holding signal 242, the third holding signal 244 and the fourth holding signal 246, respectively. OutData is the first tilt signal or the second tilt signal. The aforementioned differential module 208 can be a differential amplifier or a subtracter. Otherwise, the differential module 208 can be omitted and the first holding signal 240, the second holding signal 242, the third holding signal 244 and the fourth holding signal 246 can be sent directly to the microcontroller unit 210 for differentiation.

Alternatively, in other embodiments of the present invention, the level voltage preset may be set to another value, and is not limited to 100 mV. Similarly, the voltage range for the rough tuning step and the multiple for the delicate tuning step may be determined by the user.

The signal-generating module of the present invention may be, for example, a signal generator or a pulse generating circuit. The sample-and-hold module may be a sample-and-hold circuit. The differential module may be a differential amplifier, a subtracter or a microcontroller. The tilt sensor may be a single-axis electrolytic tilt sensor or a dual-axis electrolytic tilt sensor.

According to the aforementioned description, one advantage of the present invention is that an electric motor is used in the present invention so that the adjusting time of the tilt sensor may be reduced.

According to the aforementioned description, yet another advantage of the present invention is that the adjusting is composed of a rough tuning step and a delicate tuning step so that the adjusting may be sped up and the precision of the adjusting may be raised.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An adjusting method of a tilt meter, wherein the tilt meter has a tilt sensor, the adjusting method of the tilt meter comprising:

differentiating a plurality of holding signals of the same direction output from the tilt sensor, respectively, to obtain at least a tilt signal;

if the tilt signal is not in a predetermined range, a motor is driven to adjust the tilt sensor to limit the tilt signal in the predetermined range;

if the tilt signal is in the predetermined range, the tilt signal in the predetermined range is amplified by a predetermined multiple;

if the tilt signal after amplification is not equal to a level voltage, the motor is driven to adjust the tilt sensor to proceed a delicate tuning step to adjust the tilt signal to become equal to the level voltage; and if the tilt signal after amplification is equal to the level voltage, the level adjusting of the tilt meter is finished.

2. The adjusting method of the tilt meter according to claim 1, further comprising presetting the level voltage corresponding to a position in which the tilt sensor is set level.

3. The adjusting method of the tilt meter according to claim 1, wherein the motor is an electric motor.

4. The adjusting method of the tilt meter according to claim 1, wherein the tilt sensor is a single-axis electrolytic tilt sensor or a dual-axis electrolytic tilt sensor.

5. The adjusting method of the tilt meter according to claim 1, further comprising inputting a plurality of level-measuring signals to the tilt sensor, and the tilt sensor outputting a series of output signals wherein the series of output signals are then divided into the holding signals according to the level-measuring signals.

6. The adjusting method of the tilt meter according to claim 5, wherein the level-measuring signals are identically wide and are spaced at one or a plurality of intervals.

7. The adjusting method of the tilt meter according to claim 6, wherein the level-measuring signals are alternately and multi-directionally input to the tilt sensor.

8. The adjusting method of the tilt meter according to claim 7, wherein the level-measuring signals are positive pulses, negative pulses or both positive and negative pulses.

9. The adjusting method of the tilt meter according to claim 8, wherein the level-measuring signals are generated by a signal-generating module.

10. The adjusting method of the tilt meter according to claim 9, wherein the signal-generating module is a signal generator or a pulse generating circuit.

11. The adjusting method of the tilt meter according to claim 5, wherein the step of dividing the series of output signals into the holding signals occurs in a sample-and-hold module.

12. The adjusting method of the tilt meter according to claim 11, wherein the step of dividing the series of output signals into the holding signals is that the sample-and-hold module triggers and outputs the first holding signal and the second holding signal according to a plurality of trigger signals, the trigger signals being the level-measuring signals or signals having a same time sequence as the level-measuring signals.

13. The adjusting method of the tilt meter according to claim 11, wherein the sample-and-hold module is a sample-and-hold circuit.

14. The adjusting method of the tilt meter according to claim 1, wherein the step of differentiating the holding signals of the same direction to obtain the tilt signal occurs in a differential module.

15. The adjusting method of the tilt meter according to claim 14, wherein the differential module is a differential amplifier, a subtracter or a microcontroller.

16. The adjusting method of the tilt meter according to claim 1, wherein the predetermined range is 95 mV to 105 mV.

17. The adjusting method of the tilt meter according to claim 1, wherein the predetermined multiple is 10.

18. The adjusting method of the tilt meter according to claim 1, wherein the level voltage is a fixed predetermined voltage.

19. The adjusting method of the tilt meter according to claim 18, wherein the level voltage is 100 mV.

20. An adjusting method of a tilt meter, wherein the tilt meter has a tilt sensor, the adjusting method of the tilt meter comprising:

differentiating a plurality of holding signals of the same direction output from the tilt sensor, respectively, to obtain a tilt signal;

driving a motor to adjust the tilt sensor to limit the tilt signal to be within a predetermined range, if the tilt signal is outside the predetermined range;

amplifying the tilt signal by a predetermined multiple; and driving the motor to adjust the tilt sensor to proceed a delicate tuning to adjust the tilt signal to become equal to a level voltage, if the tilt signal after the amplifying is not equal to the level voltage.

* * * * *